United States Patent Office

3,277,134
Patented Oct. 4, 1966

3,277,134
PROCESS FOR PURIFYING TETRAETHYL LEAD
Herman E. Collier, Jr., Newark, Del., and John W. Eberlin, Glendora, and William S. Hillman, Concord, Calif., assignors to E. I. du Pont de Nemours and Company, Wilmington, Del., a corporation of Delaware
No Drawing. Filed Nov. 21, 1963, Ser. No. 325,463
10 Claims. (Cl. 260—437)

This invention relates to the purification of tetraethyl lead, and particularly to a novel and highly effective method for decreasing the concentration of hexaethyl dilead impurity in tetraethyl lead.

Tetraethyl lead is manufactured commercially by alkylating a lead-sodium alloy with ethyl chloride. By-products are also normally formed, including high-boiling organoleads, by incomplete ethylation and side reactions. A significant and objectionable by-product is hexaethyl dilead. According to Gittins and Mattison in U.S. Patent 2,763,673, tetraethyl lead for gasoline use should contain less than 0.3% of this impurity, but sometimes it is produced containing much more, even up to 15%, depending on process conditions. In modern technology, the hexaethyl dilead seldom exceeds 3%.

When the hexaethyl dilead content is too high, or it is desired to convert it to tetraethyl lead, the prior art suggests treatment with alkyl iodides (Krohn and Shapiro, U.S. Patent 2,555,891); with heat alone or silicaceous catalysts (McDyer and Closson, U.S. Patent 2,571,987); with carbon catalysts (Gittins and Mattison, U.S. Patent 2,763,673); or with aqueous potassium permanganate (Russian Patent 110,143). These methods tend to be either inefficient or insufficiently selective in destroying alkyllead compounds.

Hedden and Rausch, in U.S. Patent 3,072,696, reduce the hexaethyl dilead content of tetraethyl lead by treatment with aqueous formic acid or acetic acid in the presence of an oxygen-containing gas. While highly effective, such method has the disadvantage inherent in two-phase liquid systems of requiring efficient mixing of the liquid reactant layers for intimate contact.

It is disclosed, by Peck in U.S. Patent 2,293,214 and by Downing and Linch in U.S. Patent 2,407,261, among others, that tetraethyl lead, and other tetraalkyl leads produced in like manner, tends to undergo objectionable sludging attributable to unstable alkyl bismuth impurity arising from bismuth contaminant in the lead used for its manufacture. According to prior disclosures, such sludge in general, when in conjunction with adsorbed tetraalkyl lead, often tends to ignite on exposure to oxygen or air and thus constitutes a serious fire and explosion hazard. On general grounds too, formation of haze and insolubles is objectionable, for such matter tends to clog delivery lines, promote corrosion of equipment and even accelerate deterioration of the organolead product.

To remove sludging impurities from tetraalkyl leads, Peck (noted above) discloses treatment of the impure product with certain acidic reagents. Bertolette and Parmelee in U.S. Patent 2,400,383 effect precipitation of sludge-forming bismuth impurities from tetraethyl lead by treatment with oxygen, usually air. Parmelee, in U.S. Patents 2,410,356, 2,426,789 and 2,440,810 utilized the oxidizing action of aqueous hydrogen peroxide, dichromate, perborate or chlorite salts to precipitate bismuth sludge.

An object of this invention is to provide a novel and efficient process for decreasing the concentration of hexaethyl dilead in tetraethyl lead containing it. Another object is to provide such a process which destroys hexaethyl dilead with high selectivity in the presence of major amounts of tetraethyl lead and which is highly effective at moderate temperatures. A further object is to provide such a process which is simultaneously effective to convert soluble bismuth impurity, when also present in the tetraethyl lead, into a readily removable form. Other objects are to advance the art. Still other objects will appear hereinafter.

The above and other objects may be accomplished according to this invention which comprises the process for purifying tetraethyl lead which contains as soluble impurity at least 0.1% by weight of hexaethyl dilead and 0% to about 0.2% by weight of soluble bismuth compound, said impurity being formed in the manufacture of the tetraethyl lead, which process comprises
 (A) Intimately contacting said tetraethyl lead in the liquid phase,
 (B) At a temperature of from about 0° C. to about 80° C.,
 (C) With ozone in an inert carrier gas until the concentration of said soluble impurity has been decreased to the desired extent, and
 (D) Separating purified tetraethyl lead from the reaction mixture.

Preferably, there will be maintained on the surface of the tetraethyl lead, during the treatment with ozone, a layer of an aqueous medium which is substantially inert to tetraethyl lead under the conditions employed. Such aqueous medium facilitates separation of the purified tetraethyl lead from the products of the reaction.

This invention is based on the discovery that ozone is both highly selective and effective in destroying hexaethyl dilead and soluble bismuth impurity in the presence of rather large proportions of tetraethyl lead. The decrease in the concentration of the hexaethyl dilead, and in the soluble bismuth content when present, is accompanied by the appearance of haze and insoluble matter which are readily removable by conventional filtration and washing techniques. Thus, by this process, tetraethyl lead is obtained substantially free of hexaethyl dilead and objectionable organobismuth impurities. The process is easy to operate, and the quantities of materials, the temperature, and the time and intimacy of contact are easily coordinated to reduce the hexaethyl dilead content to an acceptable level, for example to below 0.3% (as suggested by Gittins and Mattison) and preferably to below 0.05%. Similarly, the Bi content can be decreased to substantially nil. The tetraethyl lead undergoing purification may be subjected to two or more ozone treatments, if necessary, to achieve the desired result. Tetraethyl lead losses can be kept low.

Besides reducing the impurity level, the process also effects a general overall improvement in the appearance and quality of the product. For example, crude tetraethyl lead, that is yellow and hazy with naturally formed contaminants, is made clear and water-white. The improved quality is reflected also in standard oxidation stability tests on fuel compositions consisting essentially of gasoline and an antiknock blend of the tetraethyl lead. The fuel compositions, containing the treated tetraethyl lead, show significantly longer induction periods.

The impure tetraethyl lead to be treated according to the method of this invention will contain at least 0.1% by weight of hexaethyl dilead, ordinarily from 0.1% to about 3% by weight. In one embodiment, the tetraethyl lead may be the art-recognized steam distilled and aerated product. Such product is substantially free of sludge-forming organic bismuth compounds, by which is meant that, on being further aerated by passing air through the charge in the presence of water, it forms less than 0.002 gram of sludge per 100 ml. of tetraethyl lead. While the sludge-forming bismuth impurities are ordinarily removed by aerating as described for example by Bertolette and Parmelee in U.S. Patent 2,400,383, other variations involving oxidizing conditions may also be employed as described by Parmelee in U.S. Patents 2,410,356, 2,440,810, and 2,426,789. Such treatments, while effective to remove the organic bismuth compounds, are not practical to lower the hexaethyl dilead content to nonobjectionable levels (when such impurity also occurs).

Normally, in carrying out the process of this invention, the ozone will be employed in the form of a stream of ozonized air or ozonized oxygen. Such stream, in containing oxygen, is inherently capable of precipitating bismuth impurity in accordance with the disclosure of Bertolette et al. in U.S. Patent 2,400,383. However, it has also been found in accordance with the present process that, with ozone in the air or oxygen stream, the tetraethyl lead is debismuthized at a somewhat faster rate.

Therefore, the preferred embodiment of this invention involves treating crude, unaerated tetraethyl lead with an ozone-containing air stream to remove hexaethyl dilead (hexa) and organobismuth simultaneously, and thereby eliminate the necessity for a separate hexa removal step. In such case, the impure tetraethyl lead will ordinarily contain, in addition to said hexaethyl dilead, from about 0.002% to about 0.2% by weight, more usually about 0.01% to about 0.02%, of soluble bismuth, depending on the level of Bi impurity in the lead used in its manufacture. Virgin lead normally contains about 0.02% wt. Bi (200 p.p.m.). However, the Bi content may vary considerably upwards or downwards depending on the prior processing history of the starting lead.

Ozone, its generation, and its use in chemical technology, is rather fully described in Kirk-Othmer's Encyclopedia of Chemical Technology, vol. 9, Interscience, pages 735–753; in No. 21 of the Advances in Chemistry Series, Ozone Chemistry and Technology, Am. Chem. Soc. 1959; by Smith et al. in Organic Syntheses, vol. 26, pages 63–76; and by Bailey in Chemical Reviews 58, 925–1010 (1958).

In the process of this invention, the ozone is employed in an inert carrier gas (substantially inert to the tetraethyl lead and to the ozone). For such purposes, the ozone is conveniently and economically produced by the action of an ozonator discharge on air or oxygen, whereby it is obtained diluted with said source gas in concentrations normally ranging from about 0.1 to about 40 mg./liter of said oxygen or air, the oxygen or air being an inert carrier gas of this invention. More usual operating concentrations of ozone are in the range of about 5 to about 30 mg./liter. The higher concentrations are preferred, since the higher the ozone level the more rapid the rate of destruction of the impurities in the tetraethyl lead. Other carrier gases for ozone, which are inert at the temperatures of operation, may be used; e.g., carbon dioxide, nitrogen, helium, neon, and methane. Practically, however, the carrier gas, normally and preferably, will be air.

The quantity of ozone needed depends on the hexaethyl dilead and Bi content of the tetraethyl lead, the time of contact allotted, the efficiency of the gas-liquid contact and the effect desired, and usually is in the range of 1 to about 30 moles of ozone per atom of metal impurity (Pb and Bi combined). More usually, not more than about 15 moles of ozone per atom of total metal impurity is required. While ozone, used according to the process of this invention, is highly selective in destroying the impurities, unduly prolonging the contact of the ozone stream with the tetraethyl lead beyond the time required to achieve the desired result is normally avoided, particularly at high ozone concentrations or at elevated temperatures.

The process is easy to operate. Ozone is simply brought into intimate contact with the tetraethyl lead composition to be treated, by blowing the ozone-carrier gas stream through said composition at a rate sufficient to provide good gas-liquid contact. Flow rates of the order of up to 2 liters/min./100 ml. of liquid, preferably 0.1 to 1 liter/min./100 ml. suffice, and no additional means of agitation are required.

Reaction temperatures of from 20° C. to 70° C. are ordinarily used, more broadly 0° C. to 80° C. However, it is believed that still higher temperatures may be used, consistent with the stability of the tetraalkyl lead system. Cooling the reaction mass does not appear necessary but may be employed. The reaction is rapid, the time required depending primarily on the hexaethyl dilead and bismuth content of the starting composition, the ozone concentration, the intimacy of the gas-liquid contact and the result desired. Entrainment losses of volatile components can be minimized in the usual way through use of condensing means in the off-gas line.

As the hexaethyl dilead and the soluble bismuth impurity are destroyed, the reaction products collect as haze and precipitate in the reaction mixture and are readily separated from the tetraethyl lead composition by filtration or washing with water or dilute aqueous alkali, including the alkali metal hydroxides, carbonates and bicarbonates, and aqueous solutions of ammonia or of watersoluble amines. Both filtration and washing may be used, if desired.

The recovered tetraethyl lead composition is of high purity and is highly resistant to sludging. It can be used directly in the formulation of antiknock blends with the usual addition agents such as ethylene dibromide, ethylene dichloride, and an identifying dye.

Preferably, and particularly when Bi impurity is present, the ozonized air treatment is effected in the presence of an aqueous phase in substantially the manner described by Bertolette et al. in U.S. Patent 2,400,383. In other words, a layer of an aqeuous medium, which is substantially inert to tetraethyl lead, will be maintained on the surface of the tetraethyl lead composition during the treatment with ozone. The aqueous medium may be water or other suitable aqueous washing medium of the character hereinbefore described. The resulting reaction mixture is allowed to settle to form an upper aqueous layer and a lower layer of purified tetraethyl lead, and the layers are separated, as by drawing off the lower layer or decanting the upper layer. The quantity of aqueous phase should suffice to provide a separate continuous layer covering the surface of the tetraethyl lead composition, and for convenient handling should correspond to about 5 to 100 volume percent of the tetraethyl lead composition being treated. The treated tetraethyl lead product may be filtered or further washed, as above, if necessary to remove sludge and residual haze.

While the process is ordinarily applied to tetraethyl lead itself, it may be carried out in a normally liquid inert solvent which is both an ozonization medium (i.e. substantially inert to ozone under the conditions of treatment) and an inert solvent for tetraethyl lead. Practically, the solvent usually will boil within the range of about 150° C. to about 250° C. (at atmospheric pressure), preferably in the range of about 150° C. to 220° C. Also preferably, the solvent will be a stabilizer for the tetraethyl lead or will contain a stabilizing quantity of such a stabilizer which is also suitable for use as an ozonization medium. A wide variety of normally liquid ozonization media are known, as more particularly disclosed by Bailey, Chemical Reviews 58, 925–1010 (1958), which are also solvents for and suitably inert towards tetraethyl lead, and which may be used in this process. Obviously, it will be preferred to use those substances and mixtures thereof which not only can stabilize tetraethyl lead against various modes of decomposition but which have utility also in other areas such as in the formulation of antiknock blends.

Suitable ozonization solvents include the normally liquid alkanes, haloalkanes, nitroalkanes, aromatic hydrocarbons, haloaromatic hydrocarbons, and saturated aliphatic carboxylic esters, ketones, carboxamides and ethers. It will be recognized that many of these classes of compounds also have utility as stabilizers for tetraalkyl lead compounds, as disclosed by Calingaert in U.S.

Patents 2,660,591-6 and by Cook et al. in U.S. Patent 3,049,558, particularly the saturated aliphatic hydrocarbons and the aromatic hydrocarbons, such as gasoline hydrocarbons of the alkylate and aromatic type, including refinery fractions and individual components thereof, exemplified by hexane, heptane, isooctane, benzene, toluene, ethylbenzene, the xylenes, and mixtures thereof. When mixtures are used, a major proportion should preferably boil between 150° C. and 220° C. In other words, for maximum effectiveness, the stabilizer should boil close to and preferably bracket the boiling point of tetraethyl lead.

It will also be recognized that many of the haloalkanes and haloaromatic hydrocarbons, which are suitable as ozonization solvents, also have fire-retardant properties and hence are desirable solvent components. Preferred are those having utility as scavengers for lead in the operation of spark ignition internal combustion engines, broadly those containing 2-3 halogen atoms of atomic numbers 17 to 35, 2 to 8 carbons, and normally boiling below 250° C., particularly the ethylene dihalides, ethylene dichloride, ethylene chlorobromide, and ethylene dibromide. Other halohydrocarbons that may be used are the corresponding propylene dihalides, chlorobenzene, dichlorobenzene, bromobenzene, dibromotoluene, and the like.

The quantity of solvent material may vary widely, but considering that tetraethyl lead is normally sold as a concentrate, undue dilution should be avoided. For example, the solvent matter may account for 5% to 65% by weight of the composition, usually 10% to 50% by weight, the rest consisting essentially of tetraethyl lead.

The following examples more clearly illustrate the invention, preferred modes of carrying it into effect, and the advantageous results to be obtained thereby.

In these examples, ozone was generated in a Welsbach Model T-23 Laboratory Ozonator, by passing dry air through the electric discharge of the ozonator and adjusting the air flow rate and the applied voltage to vary the ozone concentration.

In the general operating procedure, which is merely illustrative, the ozone-carrier stream is blown up through the liquid, a 100-ml. (165-gram) charge of the tetraethyl lead composition, at a rate sufficient to provide intimate mixing and result in a high degree of ozone utilization. Periodically, the tetraethyl lead phase is observed for visual changes, then is filtered and its residual hexaethyl dilead (hexa) and soluble bismuth (Bi) content determined.

Example 1

An ozonized air stream, containing 9.14 mg. $O_3$/liter of air, was sparged up through a 164 gram portion of steam distilled, previously aerated (nil Bi) tetraethyl lead, containing 0.42% wt. hexa, at 25° C. and at a flow rate of 0.6 liter/minute. After 14 minutes, corresponding to the use of a total of 8.4 liters of said ozone stream, the "hexa" content was only 0.07% wt.

The molar ratio of ozone introduced ($8.4 \times 9.14 = 76.8$ mg. $O_3 = 1.6$ millimoles) to hexa destroyed (0.35% wt. = 574 mg. = 0.96 millimoles) is 1.67:1, which indicates a highly efficient process in view of the fact that gas-liquid contact is involved.

Example 2

The procedure of Example 1 was repeated on a steam distilled unaerated tetraethyl lead analyzing 0.0035% wt. soluble bismuth (Bi) and 0.60% wt. hexa. The air stream contained 11.3 mg./liter of ozone and was utilized at a flow rate of 0.58 liter/min. After 4 minutes of treatment, the soluble Bi content was nil (which corresponds to the removal of 0.0274 millimoles Bi), and the hexa content was 0.42% wt. After 8 minutes, the hexa content was ½ the original level (which corresponds to the removal of 0.836 millimoles hexa). The molar ratio of total ozone introduced ($0.58 \times 8 \times 11.3/48 = 1.09$ millimoles) to total impurity destroyed was 1.3:1.

Example 3

As indicated below and in comparison with Examples 1 and 2, increasing the ozone concentration or the reaction mass temperature results in a decreased reaction time for hexa removal.

100 ml. (164 grams) of steam distilled aerated tetraethyl lead, containing hexa as indicated below and nil Bi, was covered with 50 ml. of water and, while at a temperature of either 25° C. or 40° C., was sparged with ozonized air having a concentration of 32.5 mg. $O_3$/liter at a flow rate of 0.7 liter/min. After a period of time as designated below, the reaction mixture was settled, the tetraethyl lead layer removed, filtered and analyzed. The results are tabulated below.

REMOVAL OF HEXA FROM TEL BY OZONIZATION

| | Hexa Content, Percent Wt. After Treatment | |
|---|---|---|
| | At 25° C. | At 40° C. |
| Elapsed Time, Seconds: | | |
| 0 | 0.16 | 0.19 |
| 60 | 0.12 | 0.18 |
| 100 | 0.11 | nil |
| 140 | nil | nil |
| Molar ratio of $O_3$ added/hexa removed | 2.4/1 | 1.5/1 |

Example 4

Steam distilled unaerated tetraethyl lead, containing organobismuth and hexa as indicated below, was treated at 45° C. as in Example 3 with ozonized air (25.3 mg. $O_3$/liter) at a flow rate of about 1.3 liter/min. Further details and the results of such treatment are tabulated below.

REMOVAL OF BI AND HEXA BY OZONE TREATMENT AT 45° C.

| Time, Seconds | Liters of $O_3$-Air Introduced | Amount of $O_3$ Introduced, mg. | Hexa, Percent Wt. | Bi, Percent Wt. |
|---|---|---|---|---|
| Initial | | | 0.25 | 0.0070 |
| 15 | 0.368 | 9.31 | 0.21 | 0.0035 |
| 30 | 0.623 | 15.76 | 0.18 | nil |
| 60 | 1.268 | 32.08 | 0.11 | nil |
| 75 | 1.557 | 39.39 | 0.06 | nil |
| 90 | 1.871 | 47.34 | nil | nil |

It will be noted that the molar ratio of $O_3$ added in 30 seconds to Bi destroyed is about 6:1, and that of $O_3$ added to hexa destroyed in 90 seconds is about 1.4:1.

In control experiments with air instead of ozonated air, the bismuth content was also reduced as already disclosed in the art, but usually at a slower rate, while the hexa content remained substantially unaffected. For example, in a control run using air in place of $O_3$-air for 30 seconds at the same flow rate providing 0.623 liter of air, the hexa content was 0.22% and that of Bi was 0.0010. Under these conditions, ozone appears to be somewhat faster for Bi removal than air itself.

As a further example, operating essentially as described in Example 3, the hexa content of tetraethyl lead is reduced from 0.17% wt. to 0.05% wt. on treating for 2.5 minutes at 25° C. with air containing 27 mg. $O_3$/liter, whereas treatment with air alone for as long as 10 minutes results in only a slight change to 0.16% weight.

It will be understood that the preceding examples have been given for illustrative purposes solely and that this invention is not limited to the specific embodiments described therein. On the other hand, it will be readily apparent to those skilled in the art that, subject to the limitations set forth in the general description, many variations can be made in the materials, proportions, rates, conditions, and techniques employed without departing from the spirit and scope of this invention.

From the foregoing description, it will be apparent that this invention provides a novel and improved process for purifying tetraethyl lead by destroying hexaethyl dilead and other naturally occurring impurities therein. The ozone is highly selective and efficient for the purpose, particularly for destroying hexaethyl dilead. The process is simple, economical and easy to operate and control so as to obtain the desired purification. Accordingly, it is apparent that this invention constitutes a valuable advance in and contribution to the art.

The embodiments of the invention in which an exclusive property or privilege is claimed are defined as follows:

1. The process for purifying tetraethyl lead which contains as soluble impurity at least 0.1% by weight of hexaethyl dilead and 0% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from 0° C. to about 80° C.,
   (C) with ozone in an inert carrier gas which consists essentially of a member of the group consisting of air and oxygen until the concentration of said soluble impurity has been decreased to the desired extent, and
   (D) separating purified tetraethyl lead from the reaction mixture.

2. The process for purifying tetraethyl lead which contains as soluble impurity at least 0.1% by weight of hexaethyl dilead and 0% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from about 0° C. to about 80° C.,
   (C) with ozone in an inert carrier gas which consists essentially of a member of the group consisting of air and oxygen until the tetraethyl lead has been contacted with at least 1 mole of ozone per atom of metal in said impurity, and
   (D) separating purified tetraethyl lead from the reaction mixture.

3. The process for purifying tetraethyl lead which contains as soluble impurity at least 0.1% by weight of hexaethyl dilead and 0% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from about 0° C. to about 80° C.,
   (C) with air containing from about 0.1 to about 40 mg. of ozone per liter of air until the tetraethyl lead has been contacted with from 1 to about 30 moles of ozone per atom of metal in said impurity, and
   (D) separating purified tetraethyl lead from the reaction mixture.

4. The process for purifying tetraethyl lead which contains as soluble impurity at least 0.1% by weight of hexaethyl dilead and 0% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from about 0° C. to about 80° C.,
   (C) with air containing from about 5 to about 30 mg. of ozone per liter of air until the tetraethyl lead has been contacted with from 1 to about 15 moles of ozone per atom of metal in said impurity, and
   (D) separating purified tetraethyl lead from the reaction mixture.

5. The process for purifying tetraethyl lead which contains as soluble impurity 0.1% to about 3% by weight of hexaethyl dilead and about 0.002% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from about 0° C. to about 80° C.,
   (C) with ozone in an inert carrier gas which consists essentially of a member of the group consisting of air and oxygen until the concentration of said soluble impurity has been decreased to the desired extent, and
   (D) separating purified tetraethyl lead from the reaction mixture.

6. The process for purifying tetraethyl lead which contains as soluble impurity 0.1% to about 3% by weight of hexaethyl dilead and about 0.002% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from about 0° C. to about 80° C.,
   (C) with air containing from about 5 to about 30 mg. of ozone per liter of air until the tetraethyl lead has been contacted with from 1 to about 15 moles of ozone per atom of metal in said impurity, and
   (D) separating purified tetraethyl lead from the reaction mixture.

7. The process for purifying tetraethyl lead which contains as soluble impurity at least 0.1% by weight of hexaethyl dilead and 0% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from about 0° C. to about 80° C.,
   (C) with ozone in an inert carrier gas which consists essentially of a member of the group consisting of air and oxygen until the concentration of said soluble impurity has been decreased to the desired extent,
   (Da) maintaining a layer of an aqueous medium which is substantially inert to tetraethyl lead on the surface of the tetraethyl lead during the above treatment, and
   (Db) then recovering purified tetraethyl lead from the reaction products and said aqueous medium.

8. The process for purifying tetraethyl lead which contains as soluble impurity at least 0.1% to about 3% by weight of hexaethyl dilead and about 0.002% to about 0.2% by weight of soluble bismuth compound, said impurity being formed in the manufacture of the tetraethyl lead, which process comprises
   (A) intimately contacting said tetraethyl lead in the liquid phase
   (B) at a temperature of from about 0° C. to about 80° C.,
   (C) with ozone in an inert carrier gas which consists essentially of a member of the group consisting of air and oxygen until the concentration of said soluble impurity has been decreased to the desired extent,
   (Da) maintaining a layer of an aqueous medium which is substantially inert to tetraethyl lead on the surface of the tetraethyl lead during the above treatment, and (Db) then recovering purified tetraethyl lead from the reaction products and said aqueous medium.

9. The process for purifying tetraethyl lead which contains as soluble impurity 0.1% to about 3% by weight of hexaethyl dilead and about 0.002% to about 0.2% by weight of soluble bismuth compound, said impurity being formed in the manufacture of the tetraethyl lead, which process comprises
- (A) intimately contacting said tetraethyl lead in the liquid phase
- (B) at a temperature of from about 0° C. to about 80° C.,
- (C) with air containing from about 0.1 to about 40 mg. of ozone per liter of air until the tetraethyl lead has been contacted with from 1 to about 30 moles of ozone per atom of metal in said impurity,
- (Da) maintaining a layer of an aqueous medium which is substantially inert to tetraethyl lead on the surface of the tetraethyl lead during the above treatment, and
- (Db) then recovering purified tetraethyl lead from the reaction products and said aqueous medium.

10. The process for purifying tetraethyl lead which contains as soluble impurity 0.1% to about 3% by weight of hexaethyl dilead and about 0.002% to about 0.2% by weight of soluble bismuth compound, said impurity being formed in the manufacture of the tetraethyl lead, which process comprises
- (A) intimately contacting said tetraethyl lead in the liquid phase
- (B) at a temperature of from about 0° C. to about 80° C.,
- (C) with air containing from about 5 to about 30 mg. of ozone per liter of air until the tetraethyl lead has been contacted with from 1 to about 15 moles of ozone per atom of metal in said impurity,
- (Da) maintaining a layer of an aqueous medium which is substantially inert to tetraethyl lead on the surface of the tetraethyl lead during the above treatment, and
- (Db) then recovering purified tetraethyl lead from the reaction products and said aqueous medium.

References Cited by the Examiner
UNITED STATES PATENTS 2,400,383   5/1946   Bertolette et al. _____ 260—437

OTHER REFERENCES

Aleksandrov et al.: Chemical Abstracts, vol. 56, No. 1, Jan. 8, 1962, p. 492d.

TOBIAS E. LEVOW, *Primary Examiner.*

E. C. BARTLETT, H. M. S. SNEED,
*Assistant Examiners.*